Patented July 9, 1929.

1,720,533

UNITED STATES PATENT OFFICE.

JOHN C. WICHMANN, OF LOS ANGELES, CALIFORNIA, ASSIGNOR TO CACTUS RUBBER COMPANY OF AMERICA, A CORPORATION.

RUBBER COMPOUND SUITABLE FOR FLOOR COVERINGS.

No Drawing.   Application filed September 20, 1927.  Serial No. 220,844.

My invention relates to a rubber compound suitable for floor coverings and which may be used in the same manner and serve the same purpose as linoleum or rubber matting.

It is an object of this invention to compound a composition which compares favorably with linoleum or rubber as a floor covering, which may be used with or without a fabric backing such as burlap, which is resilient, water proof, durable and inexpensive of manufacture.

My invention consists of the composition of matter hereinafter described and claimed.

I use the following ingredients in the proportions stated, by weight: 25 parts of cork, 15 parts of pumice, 10 parts of magnesite, 10 parts of diatomaceous earth, 5 parts of linseed oil, and 35 parts of a rubber compound.

The cork is ground to a fineness of 60–80 mesh screen, the pumice, magnesite and diatomaceous earth to a fineness from 80–100 mesh screen. The rubber compound is one derived from a treatment of the juice of the cactus family (Cactaceas), the Burbank spineless cactus (prickly pear) and ocotilla, and may be prepared as described in either of my U. S. Patents No. 1,379,149 granted May 24, 1921, or No. 1,435,360 granted November 14, 1922, or any other suitable method.

The rubber compound is heated to about 120 degrees F., which temperature will melt the same and it will assume the fluidity of ordinary molasses. The other ingredients are now added thereto and the mixture is kept at this temperature for about thirty minutes under constant and thorough agitation to form a homogeneous mass. It will assume a plastic consistency like very heavy molasses and be of a light brown color.

The mixture is now rolled into sheets, preferably by being passed through rollers of any suitable construction, and is preferably rolled onto a fabric base, such as burlap, in the same manner as used in the manufacture of linoleum. In fact it may be treated with pigments and pattern effects may be produced resembling the well known rubber and linoleum floor coverings on the market. The floor covering thus prepared, after cooling, compares favorably with the floor coverings just mentioned in its durability, resiliency, water proof qualities, and appearance.

The proportions of the ingredients may be varied within wide limits though best results are obtained by adhering to them rather closely; and of the ingredients pumice, magnesite and diatomaceous earth, any one or any two may be omitted by using a correspondingly larger amount of the other or others remaining, though best results will again be obtained by following the formula as set forth.

Various changes may be made in the steps of the process by those skilled in the art without departing from the spirit of my invention as claimed.

I claim:

A composition suitable for a floor covering consisting of the following ingredients, the proportions stated being by weight, ground cork 25 parts, pumice 15 parts, magnesite 10 parts, diatomaceous earth 10 parts, linseed oil 5 parts, and a rubber compound derived from the cactus family 35 parts.

In testimony whereof I have signed my name to this specification.

JOHN C. WICHMANN.